United States Patent [19]

Goodman

[11] Patent Number: 4,826,310
[45] Date of Patent: May 2, 1989

[54] CONSTANT CENTER OF GRAVITY FILM CAMERA MAGAZINE

[76] Inventor: Ronald C. Goodman, 12320 Montana Ave., #303, Los Angeles, Calif. 90049

[21] Appl. No.: 219,593

[22] Filed: Jul. 15, 1988

[51] Int. Cl.⁴ .............................................. G03B 23/02
[52] U.S. Cl. .................. 352/78 R; 352/243; 242/199
[58] Field of Search ................... 352/78 R, 78 C, 243; 242/205, 206, 207, 208, 199

[56] References Cited

U.S. PATENT DOCUMENTS 3,490,833  1/1970  Gottschalk et al. ................. 352/243
3,700,316  10/1972  Kurechi ............................ 352/78 C Primary Examiner—Monroe H. Hayes
Attorney, Agent, or Firm—Blakely, Sokoloff, Taylor, Zafman

[57] ABSTRACT

A film magazine for a motion picture camera has film rolls mounted on a movable carriage so that the magazine's center of gravity remains fixed as film is exposed. A feed spindle and a take-up spindle are mounted on a carriage which is longitudinally movable within the magazine housing. As film is fed into the camera it passes over a sprocket which drives the carriage through a gear train. The displacement of the mass of the carriage compensates for the transfer of film from the feed roll to the take-up roll, thereby maintaining a constant center of gravity.

18 Claims, 6 Drawing Sheets

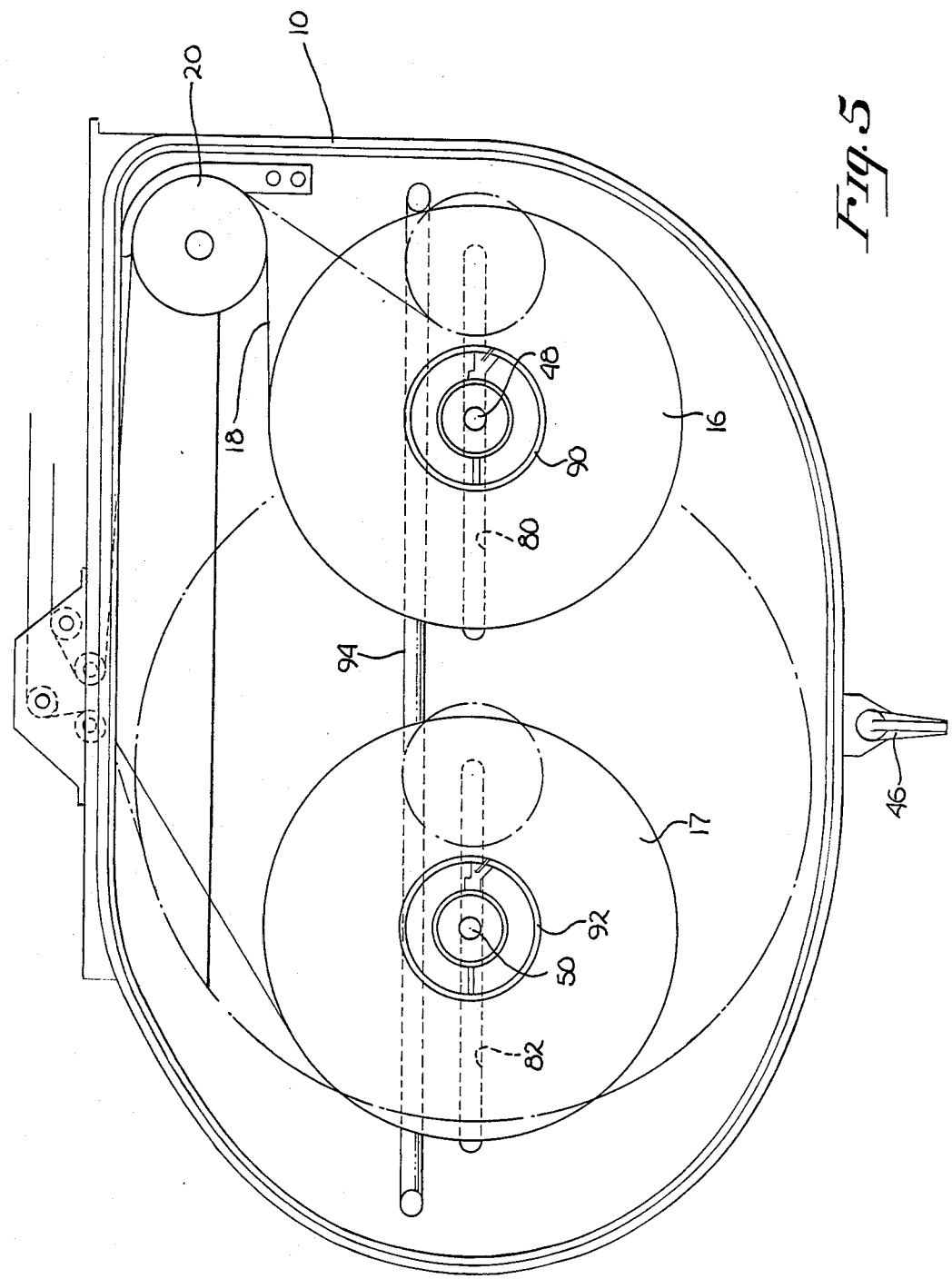

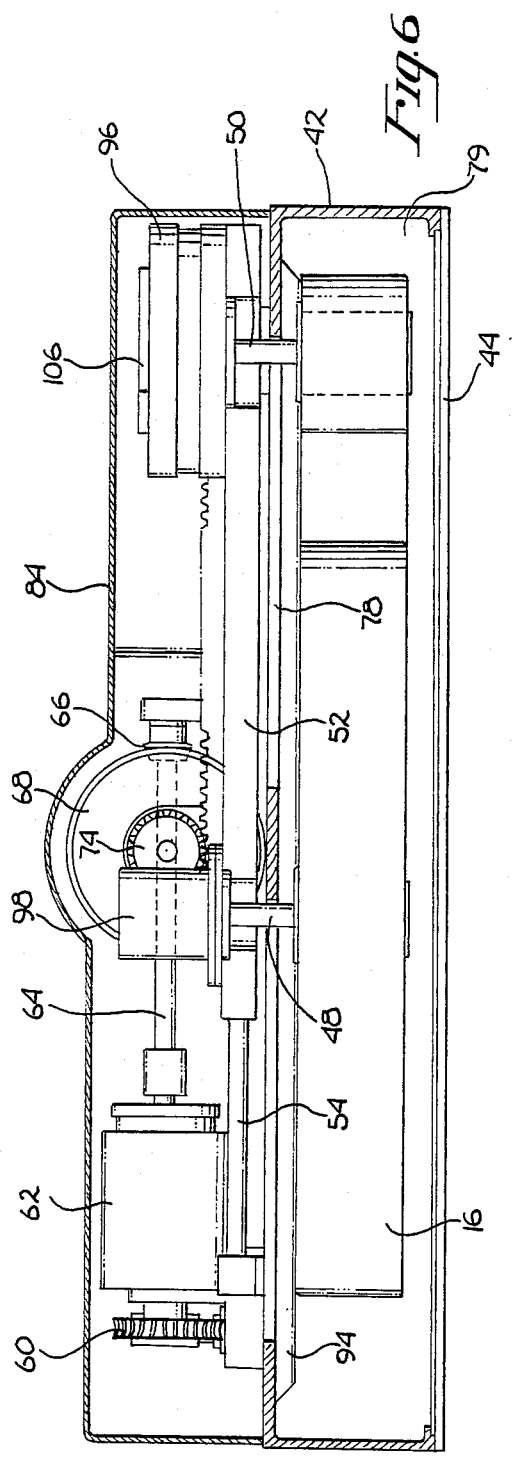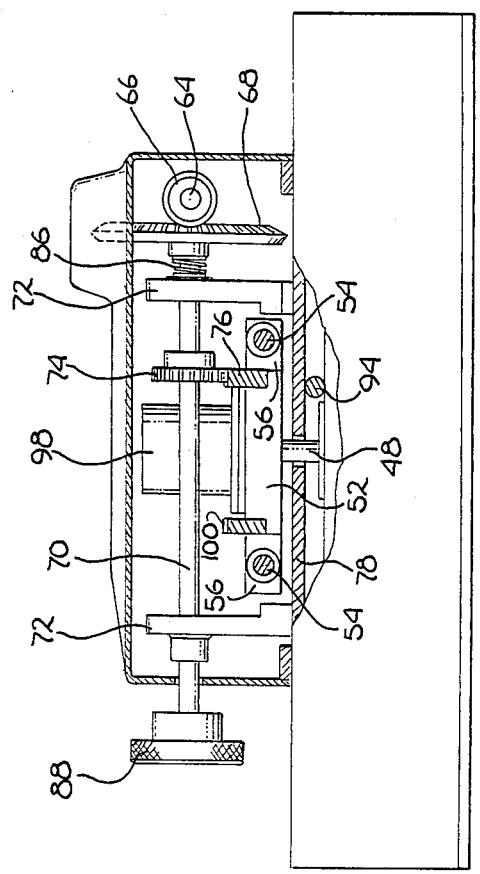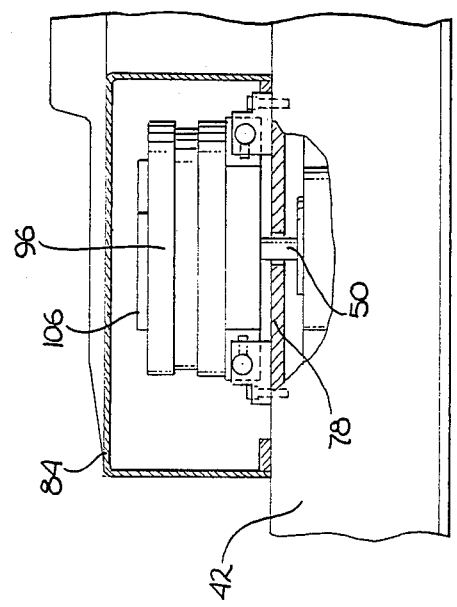

CONSTANT CENTER OF GRAVITY FILM CAMERA MAGAZINE

FIELD OF THE INVENTION

This invention relates to a film magazine for a motion picture camera and, more particularly, to a film magazine having a minimal spatial envelope and a constant center of gravity.

BACKGROUND OF THE INVENTION

It is desirable to keep the size of film magazines used on cinema cameras as small as possible to facilitate easy handling. It is also desirable to maintain a constant center of gravity on cinema film cameras and magazines when these are used on remotely controlled pan/tilt heads so that the steering mechanisms associated with these installations will perform more effectively.

In the professional film industry, many new camera systems require critical balancing of the film camera and film magazine and the maintenance of this balanced state throughout the filming process as film is exposed. This is particularly true in gyroscopically stabilized camera systems. Additionally, magazine size is often a problem for operating the equipment in confined areas, since in many camera setups the film magazine is actually larger than the camera and lens being utilized. Lastly, it is often desired to load the camera with larger film loads (i.e. 1000 feet rather than 400 feet) so that longer uninterrupted sessions may take place without reloading of the camera.

In the past, conventional or "in-line" design film magazines were used having two separate film chambers. This meant that each chamber was of sufficient diameter to accommodate a full roll of film as the feed roll was transferred to the take-up roll. This resulted in a magazine having an overall length that was a little more than twice the diameter of the full film roll.

Subsequently, film magazines of the "displacement" type were developed. Magazines of this type have one chamber with the two spindles for the feed and take-up rolls being more closely spaced than in the "in-line" design. The spindle spacing is such that the volume initially occupied by the feed roll may later be occupied by the take-up roll as the camera is run. This approach results in a reduction in the length of the magazine of approximately 20%.

Neither of the foregoing designs, however, attempted to compensate in any way for the shift in the center of gravity of the loaded magazine during filming. In instances where maintaining a constant center of gravity is important, a separate assembly, either electrically driven or driven by a flexible cable from the camera, must be added. Typically a weight is driven by a feed screw in the opposite direction to the film travel in order to effect compensation. This extra assembly adds unwanted extra weight to the camera assembly and requires extra space for its installation.

SUMMARY OF THE INVENTION

The present invention provides a film magazine for a motion picture camera having a minimal spatial envelope and a constant center of gravity throughout exposure of a roll of film.

A film supply is mounted on a feed spindle and film is routed from the feed roll into a motion picture camera and back to a take-up spindle. Both the feed and take-up spindles are mounted on a carriage which moves longitudinally within the magazine housing.

As film exits the magazine, it passes over a sprocket which provides motive power for the carriage. Rotary motion of the sprocket is transmitted through a gear train to a pinion gear which engages a rack mounted on the carriage. Gear ratios are selected such that transport of a full roll of film through the magazine results in full displacement of the carriage.

The mass of the carriage is such that its displacement compensates for the transfer of film from the feed roll to the take-up roll so that the center of gravity of the magazine remains fixed.

A rotary potentiometer is driven by another rack on the carriage to provide a measurement of the longitudinal position of the carriage and, hence, the approximate amount of film that has been exposed.

In an alternative embodiment of this invention, the carriage is driven directly by an electrical motor rather than by film movement.

BRIEF DESCRIPTION OF THE DRAWINGS

FIG. 5 is the same view as FIG. 4 illustrating a transfer of film from the feed roll to the take-up roll.

FIG. 6 is a cross-sectional view taken through line 6—6 of FIG. 3

FIG. 7 is a partial cross-sectional view taken through line 7—7 of FIG. 3.

FIG. 8 is a partial cross-sectional view taken through line 8—8 of FIG. 3.

DETAILED DESCRIPTION OF THE PREFERRED EMBODIMENTS

A constant center of gravity film camera magazine having particular application to motion stabilized camera systems is disclosed. In the following description, for purposes of explanation and not limitation, specific numbers, dimensions, materials, etc. are set forth in order to provide a thorough understanding of the present invention. However, it will be apparent to one skilled in the art that the present invention may be practiced without these specific details.

Figure 1:
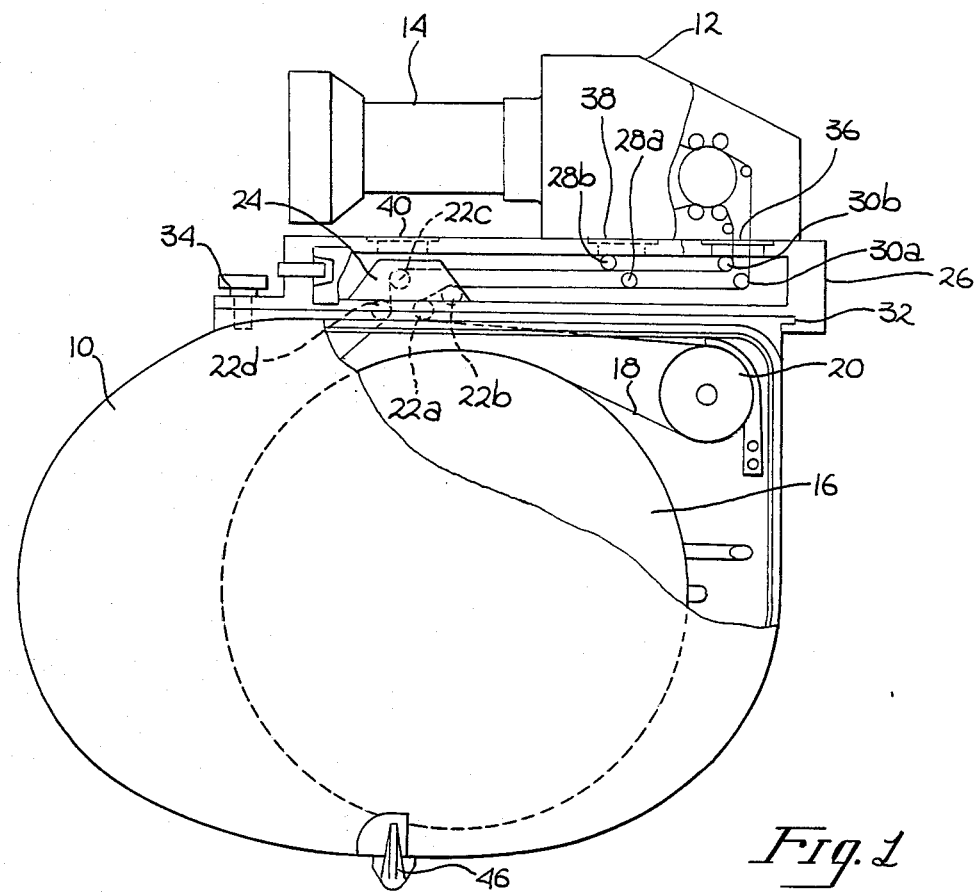
FIG. 1 is a side elevation of a film magazine according to the present invention.
Figure 2:
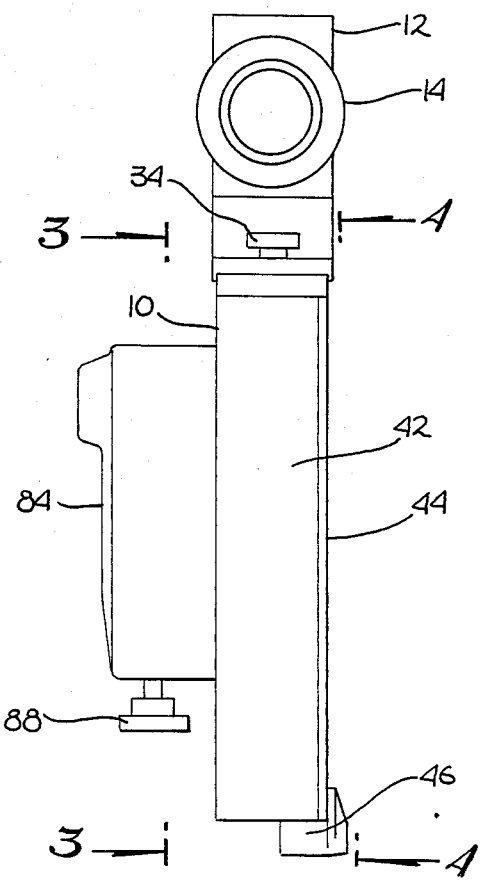
FIG. 2 is a front elevation of the film magazine of FIG. 1.

Referring to FIGS. 1 and 2, a film magazine 10 for use with motion picture camera 12 is shown. Camera 12 and lens 14 may be any of a variety of cameras and lenses commonly used in the motion picture industry. Neither camera 12 nor lens 14 forms a part of the present invention and will not be described in further detail so as not to obscure the disclosure of this invention.

Magazine 10 is attached to motion picture camera 12 by means of adapter 26. Adapter 26 comprises a hollow rectangular box to which camera 12 is secured by suitable means familiar to those skilled in the art. Magazine 10 is attached to adapter 26 by thumb screw 34 and lip 32 which engages a corresponding slot at the rear of adapter 26. Magazine 10 may thus be readily attached to and detached from adapter 26 to facilitate film loading and unloading.

Magazine 10 houses a supply 16 of motion picture film 18. In the described embodiment, film 18 is 35 mm motion picture film of the type commonly used in the motion picture industry. It will be appreciated, however, that various embodiments of magazine 10 may be constructed for use in connection with other film formats.

Film 18 is fed from feed roll 16 over sprocket 20 and then over rollers 22a and 22b in exit throat 24. Exit throat 24 extends upwardly into the interior of adapter 26. As illustrated in FIG. 1, unexposed film 18 extends rearwardly within adapter 26, passes over roller 30a, and then moves upwardly through aperture 36 into camera 12. Exposed film returns from camera 12 downwardly through aperture 36 and over rollers 30b, 22c and 22d before reentering magazine 10.

Adapter 26 preferably includes additional apertures, such as illustrated at 38 and 40. Such additional apertures allow camera 12 to be mounted at different locations on adapter 26 in order to accommodate lenses of different lengths. When camera 12 is installed over aperture 38, rollers are installed at 28a and 28b to permit film 18 to enter camera 12. When camera 12 is installed over aperture 40, film 18 extends directly upwards through exit throat 24 into camera 12. This latter configuration is illustrated by dashed lines in FIG. 4. As is apparent from the arrangement of rollers 22 a–d, film 18 may exit and enter exit throat 24 at any angle within a range of at least 90°.

Magazine 10 comprises body 42 and removable cover 44 which is held in place by means of latch 46. Removal of cover 44 permits access to the interior of body 42 for purposes of loading and unloading film 18. Body 42 is preferable cast of a lightweight material such as aluminum, although it may also be fabricated from plate stock.

Referring now to FIGS. 3–8, the mechanical operation of film magazine 10 will be described. Film feed roll 16 is mounted on feed spindle 48. Feed spindle 48 and take-up spindle 50 are spaced a fixed distance apart on carriage 52. Carriage 52 moves longitudinally within magazine 10 on slide bearings 56 which slide on rails 54. In the described embodiment, rails 54 have a round cross section as best seen in FIG. 8, although numerous other rail and bearing configurations would be apparent to a skilled mechanical designer.

In the embodiment of the present invention illustrated in FIGS. 1–8, carriage 52 is driven mechanically by a drive train which derives motive power from the rotation of sprocket 20 as film is pulled by camera 12 from feed roll 16. As will be understood by those skilled in the art, camera 12 is equipped with a system of motor driven sprockets that cause film 18 to be fed from feed roll 16 of magazine 10. Worm gear 58 is coaxially coupled to sprocket 20 and meshes with drive gear 60. Gear 60 is coupled to the input shaft of reduction gear 62, whose output shaft is coupled to shaft 64. Bevel gear 66 is mounted on shaft 64 and engages bevel gear 68 which is mounted on shaft 70. Shaft 70 is at a 90° angle to shaft 64 and is retained by bearings 72. Pinion gear 74 is attached to shaft 70 and engages rack 76 which is mounted to carriage 52. From the foregoing description of the drive train, it will be seen that rotation of sprocket 20 causes carriage 52 to move laterally within magazine 10 as indicated by the arrows in FIG. 3.

The displacement and mass of carriage 52 are such as to compensate for the transfer of mass from feed roll 16 to take-up roll 17 as film is exposed by camera 12. This results in magazine 10 having a center of gravity that remains at a fixed location throughout the exposure of the entire feed roll 16 of film. But for the motion of carriage 52, it is obvious that the center of gravity of magazine 10 would shift towards take-up roll 17. A proper distribution of mass of carriage 52 is essential for maintaining a constant center of gravity throughout a shoot. Therefore, a balance weight, such as weight 106, may be attached to carriage 52 in order to achieve precise compensation. The location and magnitude of weight 106 may be readily determined empirically by balancing magazine 10 on a straight edge as a full roll of film is transferred from feed roll 16 to take-up roll 17.

The overall reduction ratio of the drive train comprising worm gear 58, gear 60, reduction gear 62, bevel gears 66 and 68, pinion gear 74 and rack 76 is selected such that exposure of a complete roll of film will result in the full limit-to-limit travel of carriage 52. In the described embodiment, which is designed for a 1000 ft. roll of film, an overall reduction ratio of approximately 1100:1 is employed. It should be noted that "tuning" of the reduction ratio may be accomplished by the selection of reduction gear 62. However, it is possible to eliminate reduction gear 62 by judicious selection of the remaining gear ratios, in which case gear 60 may be mounted directly to shaft 64.

Carriage 52 and its associated drive train are mounted to side wall 78 of magazine body 42 opposite the film compartment 79. Slots 80 and 82 in side wall 78 permit spindles 48 and 50 respectively to pass through side wall 78 to the film compartment 79. Cover 84 attaches to the outside of side wall 78 to provide a light tight enclosure for the mechanism of magazine 10.

Figure 3:
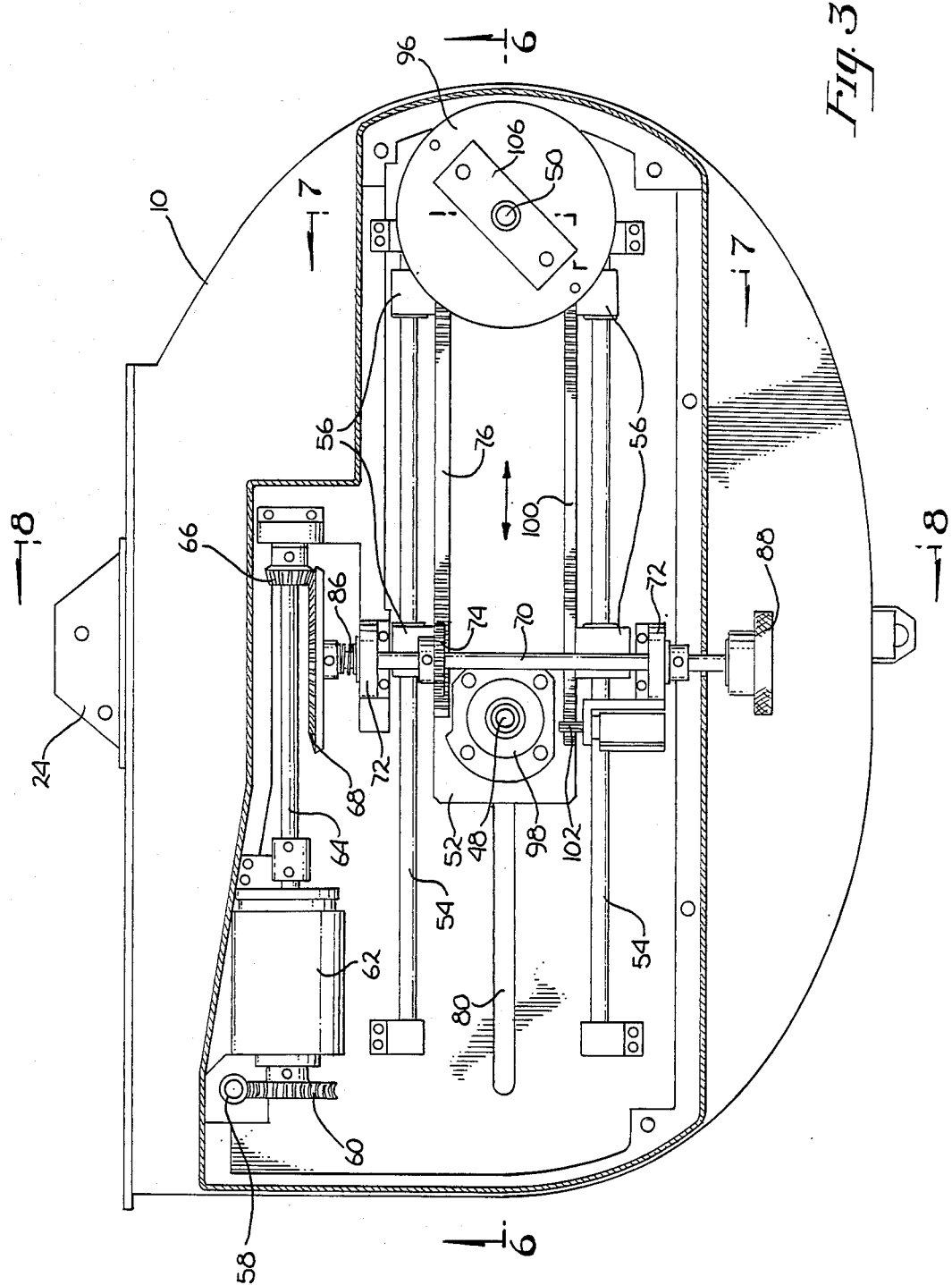
FIG. 3 is a cross-sectional view taken through line 3—3 of FIG. 2
Figure 4:
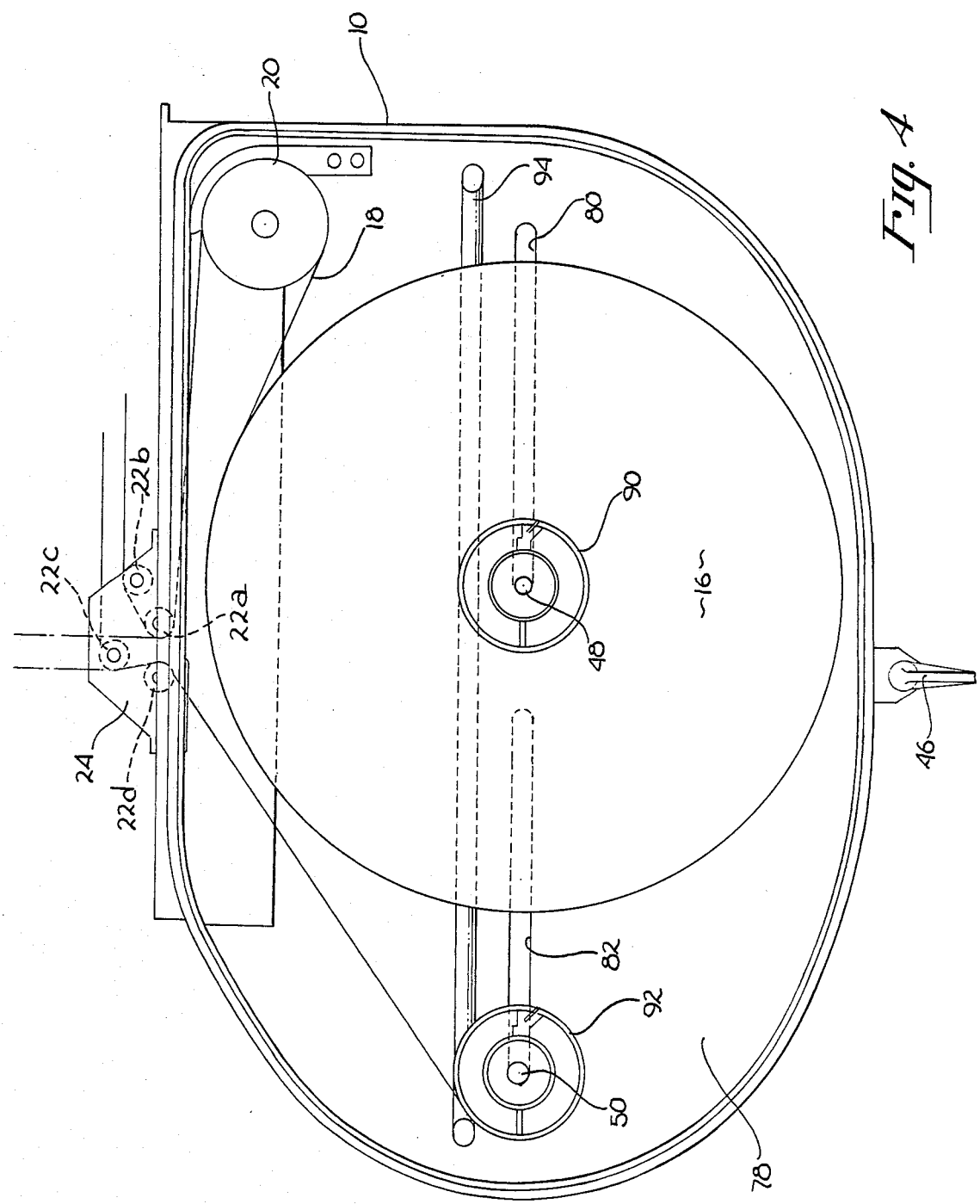
FIG. 4 is a side elevation of the film magazine of FIGS. 1-3 with the film compartment cover removed.

When reloading magazine 10 with a new supply of film, it is convenient to manually reposition carriage 52 to its starting position, as shown in FIGS. 3 and 4, by disengaging pinion 74 from rack 76. In order to effectuate a manual reset of carriage 52, shaft 70 may be laterally displaced to disengage pinion gear 74 from rack 76, thereby permitting carriage 52 to slide freely on rails 54. Shaft 70 is maintained in its operating position by means of spring 86 between bevel gear 68 and bearing support 72. Shaft 70 may be withdrawn to its disengaged position by grasping knob 88 and pulling downwardly to compress spring 86.

FIGS. 4 and 5 illustrate the longitudinal displacement of film feed roll 16 and take up roll 17 as film 18 is transferred from the former to the latter. FIG. 4 shows magazine 10 in a freshly loaded condition with a full feed roll 16. Feed roll 16 is preferably wound around a standard film core 90. An identical core 92 is installed on take up spindle 50. As camera 12 transports film 18 during exposure, spindles 48 and 50 travel to the right as viewed in FIG. 4 (to the left as viewed in FIG. 3). Referring to FIG. 5, the solid lines illustrate film rolls 16 and 17 after approximately one half of the original film supply has been exposed. The phantom lines in FIG. 5 illustrate the condition following exposure of the entire film supply. Rub strip 94 is attached to the side wall 78 to prevent film 18 from scuffing against side wall 78 as rolls 16 and 17 rotate.

Referring back to FIG. 3, motor 96 is coupled to take-up spindle 50 to wind take-up roll 17 as film 18 is transported through camera 12. Motor 96 may be a DC torque motor of the same type used to power the film take-up spindle in conventional film magazines. Feed spindle 48 is coupled to drag brake 98 which prevents an overrun of spindle 48 during film transport, thereby maintaining film 18 in proper tension.

Since carriage 52 moves in synchronism with the transport of film from feed roll 16 to take up roll 17, it will be appreciated that the longitudinal position of carriage 52 provides an indication of the amount of film that has been exposed. In order to measure the longitudinal position of carriage 52, rack 100 is mounted thereto. Rack 100 engages pinion gear 102 which is mounted to potentiometer 104. The electrical resistance of potentiometer 104 thus provides a measure of the position of carriage 52. Potentiometer 104 is electrically connected to an electrical circuit (not shown) which may provide an analog or digital read-out corresponding to the position of carriage 52. Such read-out may be provided on magazine 10 itself or may be provided at a remote location for the convenience of the camera operator. Such read-out provides an approximate measure of the amount of film in magazine 10 that has been exposed and is particularly useful when it is necessary to remove a partially exposed magazine from the camera.

The electrical output of potentiometer 104 may also be advantageously employed to adjust the torque of motor 96 as a function of the size of take-up roll 17. As the diameter of roll 17 increases, it is desirable to reduce the torque of motor 96 so that a relatively uniform tension is applied to exposed film 18 as it exits camera 12.

In addition to maintaining a constant center of gravity, the magazine 10 of the present invention provides a film enclosure of minimum volume for a given quantity of film. As can be seen particularly with reference to FIGS. 4 and 5, the volume of magazine 10 need be only slightly larger than that required to accommodate a full roll of film on one spindle and an empty core on the other. Displacement of the spindles as the film is transferred from feed roll 16 to take-up roll 17 allows the outside dimensions of magazine 10 to be significantly smaller than if spindles 48 and 50 were to remain stationary and also be required to each accommodate a full roll of film.

Figure 9:
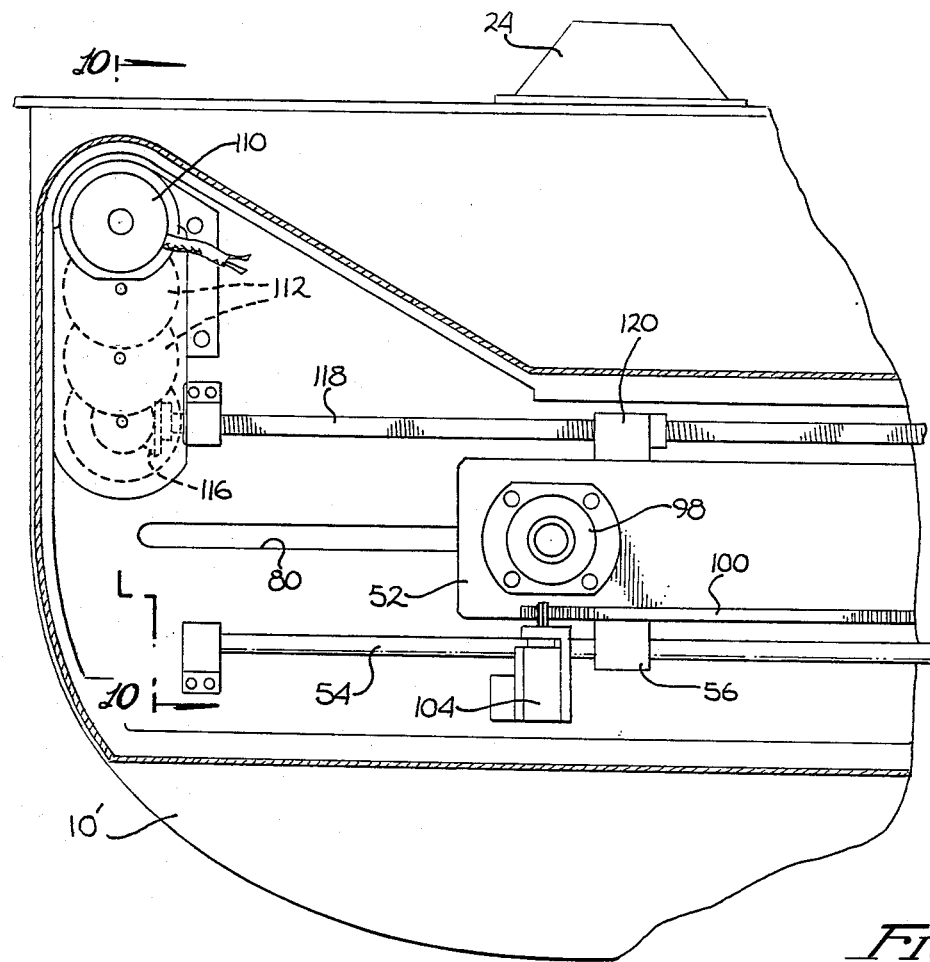
FIG. 9 is a partial side elevation of an alternative embodiment of the present invention.
Figure 10:
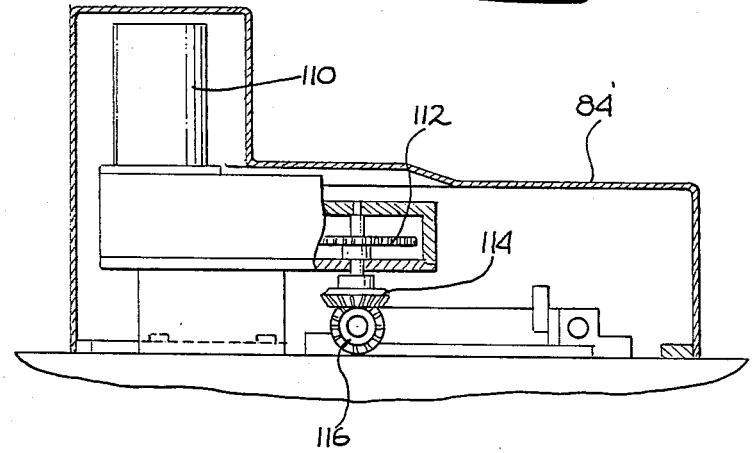
FIG. 10 is a partial cross-sectional view taken through line 10—10 of FIG. 9.

FIGS. 9 and 10 illustrate an alternative embodiment of the present invention. Magazine 10' is essentially identical to magazine 10 illustrated n FIGS. 1-8 except for the mechanism for driving carriage 52. Instead of developing drive power from sprocket 20 as in the previously described embodiment, magazine 10' includes drive motor 110. Motor 110, which may be a continuous drive DC motor or a stepper motor, drives reduction gears 112, one of which is coupled to bevel gear 114. Gear 114 engages bevel gear 116 which is attached to lead screw 118. Follower 120 is attached to carriage 52 and engages the threads of lead screw 118. By conventional electrical means such as relays, motor 110 is operated in unison with the motor drive of camera 12 such that carriage 52 is advanced in synchronism with the transport of film 18 through camera 12. In the embodiment illustrated in FIGS. 9 and 10, reset of carriage 52 to its initial position may be conveniently accomplished electronically by driving motor 110 in reverse until the initial position is sensed by means such as potentiometer 104.

It will be recognized that the above described invention may be embodied in other specific forms without departing from the spirit or essential characteristics of the disclosure. Thus, it is understood that the invention is not to be limited by the foregoing illustrative details except as set forth in the appended claims.

I claim:

1. A film magazine for supplying unexposed film to a motion picture camera and for receiving exposed film comprising:
    a housing;
    a carriage longitudinally moveable within said housing;
    a feed spindle coupled to said carriage for supplying the unexposed film to the motion picture camera;
    a take-up spindle coupled to said carriage for receiving the exposed film from the motion picture camera; and
    drive means for moving said carriage longitudinally in synchronism with a transfer of film from said supply spindle to said take-up spindle.

2. The film magazine of claim 1 wherein said drive means includes speed reduction means having a predetermined speed reduction ratio for synchronizing said longitudinal movement of said carriage with said transfer of film so as to maintain a center of gravity of said film magazine at a substantially constant location.

3. The film magazine of claim 2 wherein the unexposed film is pulled from said film magazine by the motion picture camera and said drive means comprises sprocket means for engaging the unexposed film as it is pulled from said film magazine, a pinion gear operatively coupled to said sprocket means, and a first rack mounted on said carriage for operative engagement with said pinion gear.

4. The film magazine of claim 3 further comprising take-up motor means for rotating said take-up spindle to maintain the exposed film in tension.

5. The film magazine of claim 3 further comprising drag brake means for inhibiting free rotation of said feed spindle to maintain the unexposed film in tension.

6. The film magazine of claim 3 further including position sensing means for sensing a longitudinal position of said carriage.

7. The film magazine of claim 6 wherein said position sensing means comprises a second rack mounted on said carriage and a potentiometer operatively coupled to said rack.

8. The film magazine of claim 2 wherein said drive means comprises a motor driven threaded longitudinal shaft and a threaded follower mounted on said carriage for engagement with said threaded longitudinal shaft.

9. The film magazine of claim 8 further comprising take-up motor means for rotating said take-up spindle to maintain the exposed film in tension.

10. The film magazine of claim 8 further comprising drag brake means for inhibiting free rotation of said feed spindle to maintain the unexposed film in tension.

11. The film magazine of claim 8 further including position sensing means for sensing a longitudinal position of said carriage.

12. The film magazine of claim 11 wherein said position sensing means comprises a rack mounted on said carriage and a potentiometer operatively coupled to said rack.

13. The film magazine of claim 1 further comprising exit throat means for guiding unexposed film as it exits said housing at a first angle in relation thereto and for guiding exposed film as it enters said housing at a second angle in relation thereto such that said first and second angles are selectable within a range of at least 90°.

14. A film magazine for supplying unexposed film to a motor driven motion picture camera and for receiving exposed film comprising:

a housing;

a carriage longitudinally moveable within said housing;

a feed spindle coupled to said carriage from which the unexposed film is pulled by the motion picture camera;

a take-up spindle coupled to said carriage for receiving the exposed film from the motion picture camera;

sprocket means for engaging the unexposed film as it is pulled from said feed spindle by the motion picture camera;

drive means operatively coupled to said sprocket means for moving said carriage longitudinally; and balance means for balancing the mass of said carriage such that said longitudinal movement of said carriage as unexposed film is pulled from said feed spindle maintains a center of gravity of said film magazine at a substantially constant location.

15. The film magazine of claim 14 further comprising take-up motor means for rotating said take-up spindle to maintain the exposed film in tension.

16. The film magazine of claim 14 further comprising drag brake means for inhibiting free rotation of said feed spindle to maintain the unexposed film in tension.

17. The film magazine of claim 14 further including position sensing means for sensing a longitudinal position of said carriage.

18. The film magazine of claim 17 wherein said position sensing means comprises a rack mounted on said carriage and a potentiometer operatively coupled to said rack.

* * * * *